United States Patent
Kim (10) Patent No.: US 10,538,233 B2
(45) Date of Patent: *Jan. 21, 2020

(54) METHOD FOR CONTROLLING MILD HYBRID VEHICLE

(71) Applicants: HYUNDAI MOTOR COMPANY, Seoul (KR); KIA Motors Corporation, Seoul (KR)

(72) Inventor: YoungMin Kim, Yongin-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/017,803

(22) Filed: Jun. 25, 2018

(65) Prior Publication Data

US 2019/0184970 A1 Jun. 20, 2019

(30) Foreign Application Priority Data

Dec. 18, 2017 (KR) .................. 10-2017-0174557

(51) Int. Cl.
*B60W 20/13* (2016.01)
*B60K 6/26* (2007.10)

(52) U.S. Cl.
CPC ............. *B60W 20/13* (2016.01); *B60K 6/26* (2013.01); *B60W 2510/0685* (2013.01);
(Continued)

(58) Field of Classification Search
CPC ......... B60W 20/13; B60W 2510/0685; B60W 2510/244; B60W 2550/12; B60Y 2200/92;
(Continued)

(56) References Cited

U.S. PATENT DOCUMENTS 4,762,106 A * 8/1988 Blauhut ................ F02P 5/1455
123/406.42
9,422,906 B2 8/2016 Kees et al.
(Continued)

FOREIGN PATENT DOCUMENTS

JP 2016-107650 A 6/2016

OTHER PUBLICATIONS

Lee et al., A Study on Hybrid Energy Storage System for 42V Automotive Power-net, 2006, IEEE, p. 1-5 (Year: 2006).*
(Continued)

*Primary Examiner* — McDieunel Marc
(74) *Attorney, Agent, or Firm* — Knobbe Martens Olson & Bear LLP (57) ABSTRACT

A method for controlling a mild hybrid vehicle is disclosed. The method includes determining, by a controller, whether a state of charge (SOC) of a first battery that supplies electric power to a starter-generator exceeds a reference value. The method further includes operating, by the controller, the starter-generator and a starter that is separate from the starter-generator and receives electric power from a second battery at a voltage lower than that of the first battery. A combustion engine of the mild hybrid vehicle is started using the starter-generator and the starter when it is determined that the state of charge of the first battery exceeds the reference value and it is determined that an ambient air temperature of the engine exceeds a temperature reference value.

7 Claims, 5 Drawing Sheets

(52) U.S. Cl.
CPC ... *B60W 2510/244* (2013.01); *B60W 2550/12* (2013.01); *B60Y 2200/92* (2013.01); *B60Y 2300/192* (2013.01); *B60Y 2300/91* (2013.01)

(58) Field of Classification Search
CPC .. B60Y 2300/192; B60Y 2300/91; B60K 6/26
See application file for complete search history.

(56) References Cited

U.S. PATENT DOCUMENTS

| | | | |
|---|---|---|---|
| 9,677,527 B2 | 6/2017 | Kees et al. | |
| 2013/0046435 A1* | 2/2013 | Shin ................. | F02N 11/08 701/32.8 |
| 2013/0268182 A1* | 10/2013 | Treharne ............ | F02N 11/0829 701/113 |

OTHER PUBLICATIONS

Ehsani et al., On board power management, 2004, IEEE, p. 11-17 (Year: 2004).*
Rajashekara, Parallel between More Electric Aircraft and ElectricVHybrid Vehicle Power Conversion Technologies, 2014, IEEE, p. 50-60 (Year: 2014).*
Army and the Air Force, Principles of Automotive Vehicles, 1956, Technical order, p. 1-10 (Year: 1956).*

\* cited by examiner

METHOD FOR CONTROLLING MILD HYBRID VEHICLE

CROSS-REFERENCE TO RELATED APPLICATION

This application claims priority to and the benefit of Korean Patent Application No. 10-2017-0174557 filed in the Korean Intellectual Property Office on Dec. 18, 2017, the entire contents of which are incorporated herein by reference.

BACKGROUND

(a) Field

The present invention relates to a mild hybrid vehicle (or a mild hybrid electric vehicle), and more particularly, to a method for controlling a mild hybrid vehicle.

(b) Description of Related Art

A hybrid electric vehicle uses both an internal combustion engine and a battery power source. The hybrid electric vehicle efficiently combines the torque of the internal combustion engine and the torque of a motor.

Hybrid electric vehicles may be categorized as either a hard type or a mild type according to a power sharing ratio between the engine and the motor. In the case of the mild type of hybrid electric vehicle (or a mild hybrid electric vehicle), a mild hybrid starter & generator (MHSG) configured to start the engine or generate electricity according to an output of the engine is used instead of an alternator. In the case of the hard type of hybrid electric vehicle, a driving motor for generating driving torque is used in addition to an integrated starter & generator (ISG) configured to start the engine or generate electricity.

The mild hybrid electric vehicle does not provide a driving mode in which torque of the MHSG is used for the main driving torque, but the MHSG may assist the torque of the engine according to the running state of the vehicle and may charge a battery (e.g., a 48 V battery) through regenerative braking. Accordingly, the fuel efficiency of the mild hybrid electric vehicle may be improved.

U.S. Pat. No. 9,422,906, which is a related art, may use an integrated starter-generator (ISG) when a temperature of an engine is above a predetermined temperature and the engine has to be cranked above a predetermined rotational speed.

The disclosure of this section is to provide background of the invention. Applicant notes that this section may contain information available before this application. However, by providing this section, Applicant does not admit that any information contained in this section constitutes prior art.

SUMMARY

The present disclosure has been made in an effort to provide a method for controlling a mild hybrid vehicle for improving starting performance (or starting stability) of the vehicle. The engine of the vehicle is started (1) using both a starter-generator and a starter of the vehicle or (2) using the starter only in view of an ambient air temperature of the vehicle (or the engine) and a state of charge (SOC) of a high voltage battery connected to the starter-generator.

An embodiment of the present invention may provide the method for controlling the mild hybrid vehicle, including: determining, by a controller, whether a state of charge of a first battery that supplies electric power to a starter-generator exceeds a reference value; and operating, by the controller, the starter-generator and a starter that receives electric power from a second battery that stores a voltage less than a voltage of the first battery so that an engine of the mild hybrid vehicle is started when it is determined that the state of charge of the first battery exceeds the reference value and it is determined that an ambient air temperature of the engine exceeds a temperature reference value.

The method for controlling the mild hybrid vehicle may further include: determining, by the controller, whether an ambient air temperature outside of the engine exceeds the temperature reference value. The controller may operate the starter to start the engine when it is determined that the ambient air temperature of the engine is equal to or less than the temperature reference value.

The operating the starter-generator and the starter may include: operating, by the controller, the starter-generator in order to rotate a crankshaft of the engine so that a piston of the engine is moved to a top dead center of the engine; and operating, by the controller, the starter-generator and the starter to start the engine after the piston of the engine is moved to the top dead center of the engine.

The starter-generator may be connected to the crankshaft via a belt.

A drive shaft of the starter may be connected to the crankshaft.

The controller may operate a relay of the mild hybrid vehicle in order to apply a current greater than a current reference value to the starter so that the starter starts the engine when it is determined that the state of charge of the first battery is equal to or less than the reference value.

The controller may operate a relay of the mild hybrid vehicle in order to apply a current greater than a current reference value to the starter so that the starter starts the engine when it is determined that the ambient air temperature of the engine is equal to or less than the temperature reference value.

The method for controlling the mild hybrid vehicle according to a certain embodiment of the present invention may start the engine using both the starter and the starter generator or using only the starter based on the ambient air temperature of the engine and the SOC of the high voltage battery. Therefore, stability of starting of the vehicle and the SOC of the low voltage battery may be improved.

BRIEF DESCRIPTION OF THE DRAWINGS

A brief description of the drawings will be provided to more sufficiently understand the drawings which are used in the detailed description of the present invention.

DETAILED DESCRIPTION

In order to sufficiently understand the present invention and the object achieved by embodying the present invention, the accompanying drawings illustrating embodiments of the present invention and contents described in the accompanying drawings are to be referenced.

Hereinafter, the present invention will be described in detail by describing embodiments of the present invention with reference to the accompanying drawings. In describing the present invention, well-known configurations or functions will not be described in detail since they may unnecessarily obscure the gist of the present invention. Throughout the accompanying drawings, the same reference numerals will be used to denote the same components.

Terms used in the present specification are only used in order to describe specific embodiments rather than limiting the present invention. Singular forms are to include plural forms unless the context clearly indicates otherwise. It will be further understood that the terms "include" or "have" used in the present specification specify the presence of features, numerals, steps, operations, components, or parts mentioned in the present specification, or a combination thereof, but do not preclude the presence or addition of one or more other features, numerals, steps, operations, components, parts, or a combination thereof.

Throughout this specification and the claims that follow, when it is described that an element is "coupled" to another element, the element may be "directly coupled" to the other element or "electrically or mechanically coupled" to the other element through a third element.

Unless defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

According to a related art, a gasoline engine or a diesel engine uses a system that starts a vehicle by applying a high current to a starter using a relay controlled by an electronic control unit (ECU).

Figure 5:
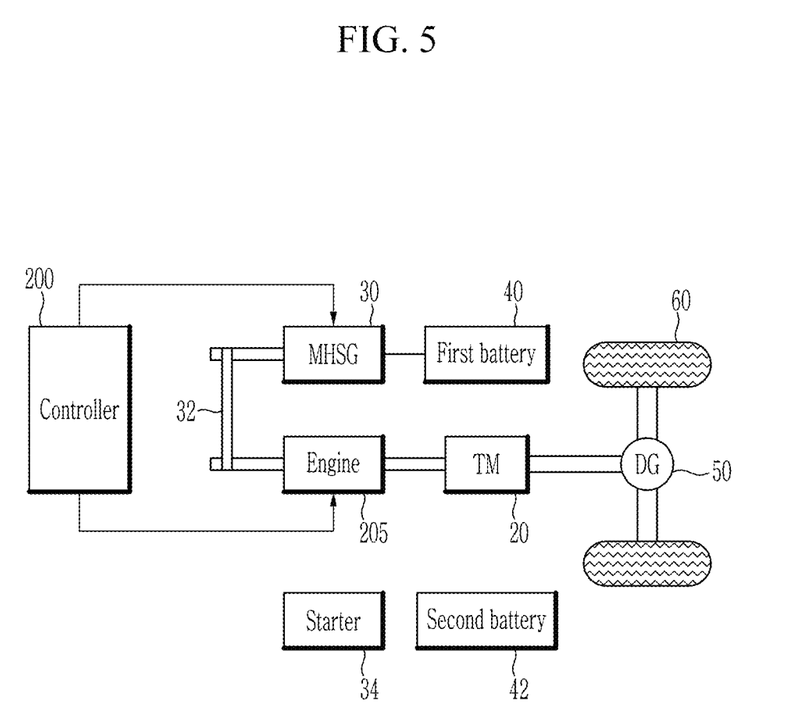
FIG. 5 is a block diagram illustrating a mild hybrid vehicle to which the method for controlling the mild hybrid vehicle shown in FIG. 1 is applied.

Disclosed is a method for starting a combustion engine in a hybrid vehicle. A hybrid vehicle has a combustion engine 205, a starter/generator unit 30 (mild hybrid starter and generator, MHSG) configured to generate electrical power using power from the engine (when the engine burns a fuel) and to start the engine using power from a first battery (a high voltage battery for supplying power to drive a wheel of the vehicle), and a starter motor 34 (separate from the starter/generator unit) configured to start the engine using power from a second battery (a low voltage battery that is not for supplying power to drive a wheel of the vehicle).

In embodiments, the first battery and the second battery are separate, and are not connected to each other such that one of the first and second batteries operates independently from a poor condition or malfunction of the other. In embodiment, the vehicle includes at least one sensor to monitor a temperature of outside atmosphere. In embodiment, the vehicle includes at least one sensor to monitor a state of charge (SOC) of the first vehicle.

At least one controller of the vehicle is configured to selectively operate the starter/generator unit 30 and the starter motor 34 based on signals from the at least one sensor monitoring an outside air temperature and further based on state of SOC (state of charge) of the first battery connected to the starter/generator unit 30. When (1) the outside air temperature is lower than a reference (for example, 5, 0, −5, −10° C.), or (2) and state of SOC of the high voltage battery is lower than a reference (for example, 20, 10, 5%), the vehicle does not operate the starter/generator unit 30 to start the engine but use only the starter motor 34.

In embodiments, when both the starter motor 34 and the starter/generator unit 30 operate together to start the engine, a first current at a reference level is supplied to the starter motor 34. In embodiments, when the starter/generator unit 30 does not operate but the starter motor 34 operates alone to start the engine in view of SOC of the first battery and the outside air temperature, a second current greater than the first current (beyond the upper limit of the reference level for the first current) the is supplied to the starter motor 34.

Figure 1:
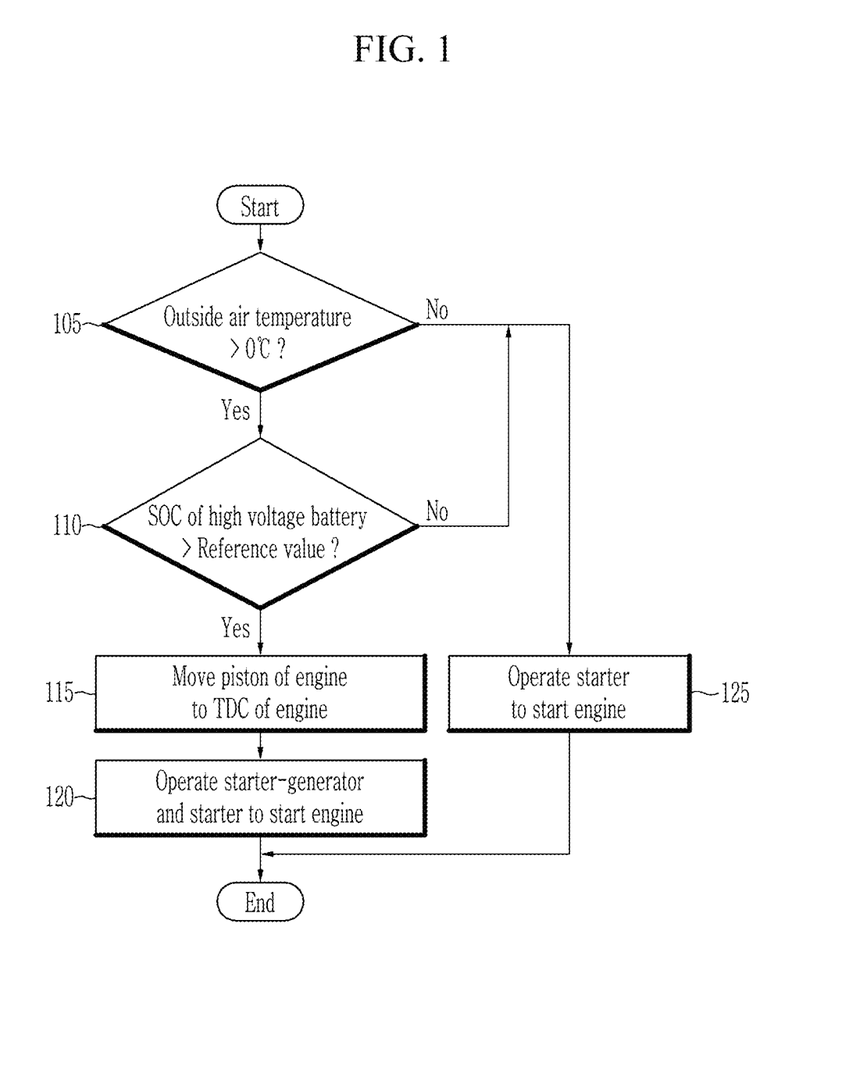
FIG. 1 is a flowchart illustrating a method for controlling a mild hybrid vehicle according to an embodiment of the present invention.
Figure 2:
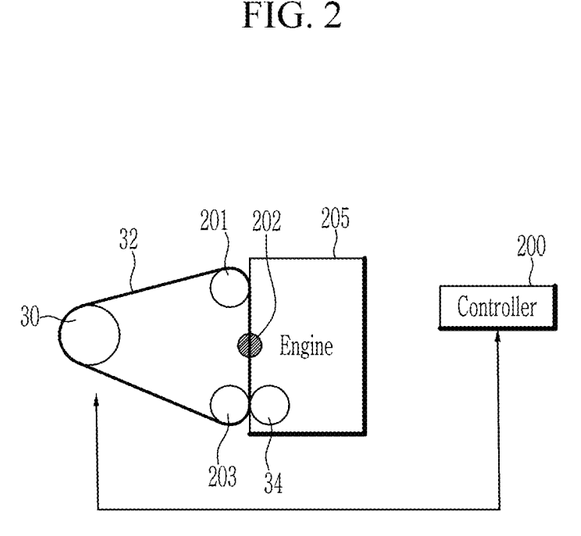
FIGS. 2 to 4 are views illustrating steps in which the starter-generator and the starter shown in FIG. 1 are simultaneously operated.
Figure 3:
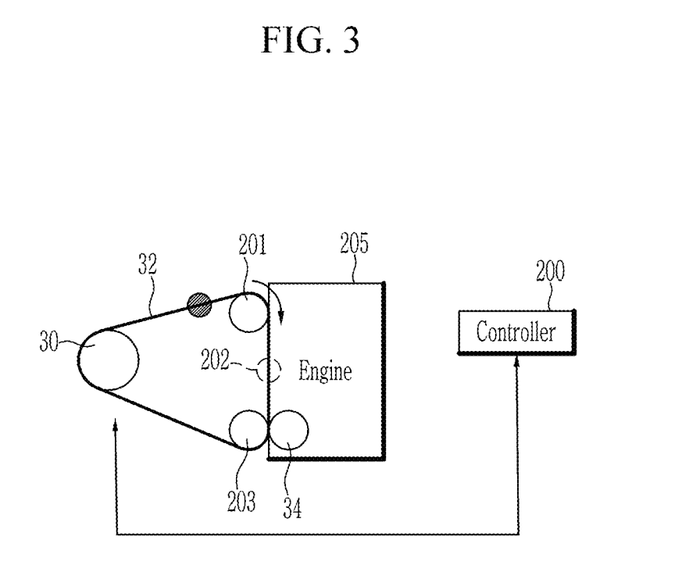
Figure 4:
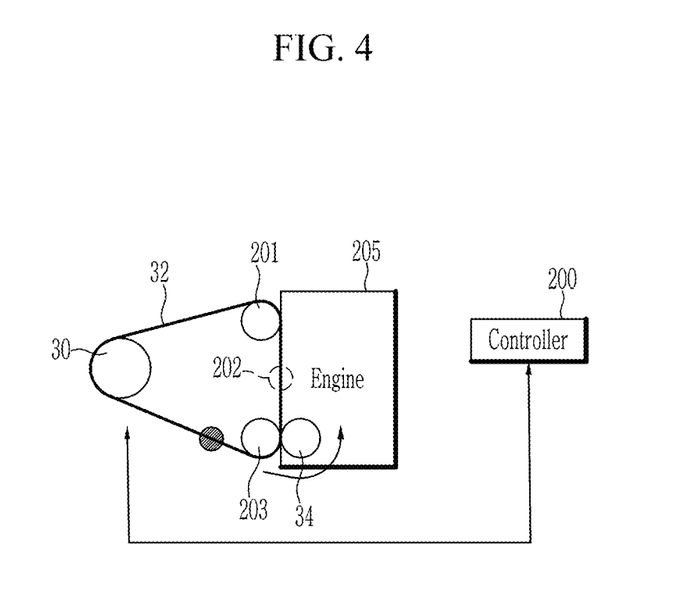

FIG. 1 is a flowchart illustrating a method for controlling a mild hybrid vehicle according to an embodiment of the present invention. FIGS. 2 to 4 are views illustrating steps in which the starter-generator and the starter shown in FIG. 1 are simultaneously operated. FIG. 5 is a block diagram illustrating a mild hybrid vehicle to which the method for controlling the mild hybrid vehicle shown in FIG. 1 is applied.

Referring to FIG. 1 to FIG. 5, in a determination step 105, a controller 200 may determine whether ambient air temperature outside of the mild hybrid vehicle or an engine 205 exceeds a temperature reference value (e.g., 0° C.). For example, the ambient air temperature may be detected by an ambient air temperature sensor of the mild hybrid vehicle and may be provided to the controller 200.

The controller 200 may control an overall operation of the mild hybrid vehicle. For example, the controller 200 such as an engine control unit (ECU) may be one or more microprocessors operated by a program or hardware including the microprocessor. The program may include a series of commands for executing the method for controlling the mild hybrid vehicle according to embodiments of the present invention. The commands may be stored in a memory.

The mild hybrid vehicle includes the engine 205, a transmission 20, a starter-generator (or a mild hybrid starter and generator) 30, a starter (or a starter motor) 34, a high voltage battery 40 that is a first battery, a low voltage battery 42 that is a second battery, a differential gear device 50, wheels 60, and the controller 200.

The engine 205 may convert chemical energy to mechanical energy by burning fuel and air. Torque of the engine 205 may be transmitted to an input shaft of the transmission 20, and torque output from an output shaft of the transmission may be transmitted to an axle of the vehicle via the differential gear device 50. The axle may rotate the wheels 60 so that the mild hybrid vehicle may be driven.

The starter-generator 30 may convert electrical energy to mechanical energy or mechanical energy to electrical energy. In other words, the starter-generator 30 may start the engine 205 or generate electricity according to an output of the engine 205. In addition, the starter-generator 30 may assist the torque of the engine 205. The mild hybrid vehicle may use the torque of the starter-generator 30 as an auxiliary power while combustion torque of the engine 205 is a main power. The engine 205 and the starter-generator 30 may be connected via the belt 32 (or a pulley and a belt).

In the mild hybrid vehicle, the starter-generator 30 may be a part performing functions of an alternator, the engine torque assist, or regenerative braking.

The starter-generator 30 may drive the engine 205 of the vehicle in a cranking and torque control mode of the vehicle (or the engine) and may generate electricity according to an output of the engine to charge a 48 V battery 40 using an inverter in an electricity generation mode of the vehicle. The starter-generator 30 may operate in an operating mode in accordance with a driving state of the vehicle. The operating mode may include an engine starting mode, an engine torque assist mode for assisting torque of the engine by operating as a motor, a mode for charging the 48 V battery charging a 12 V battery that is connected to the 48 V battery via the LDC, a regenerative braking mode for charging the 48 V battery, or an inertial driving mode for extending a mileage of the vehicle. The starter-generator 30 may be optimally controlled according to the driving state of the vehicle to increase fuel efficiency of the vehicle.

The first battery 40 may supply electricity to the starter-generator 30 or may be charged by electricity collected through the starter-generator 30 in a regenerative braking mode of the vehicle. The battery 40 may be the 48 V battery. The mild hybrid vehicle may further include a low voltage DC-DC converter (LDC) that converts voltage supplied from the battery 40 to a low voltage and the 12 V battery 42 that supplies the low voltage to an electric load of the vehicle.

According to a determination step 110, when it is determined in the determination step 105 that the ambient air temperature of the engine 205 exceeds the temperature reference value, the controller 200 may determine whether a state of charge (SOC) of the first battery 40 that supplies electric power to the starter-generator 30 exceeds a reference value. For example, the SOC of the first battery 40 may be detected by a battery sensor of the mild hybrid vehicle and may be provided to the controller 200.

According to a step 115, when the SOC of the first battery 40 is determined to exceed the reference value in the determination step 110, the controller 200 may operate or control the starter-generator 30 in order to rotate a crankshaft 203 of the engine 205 using the belt 32 so that a piston of the engine is moved to a top dead center (TDC) 202 of the engine, as shown in FIGS. 2 to 4. A camshaft 201 included in an auxiliary machinery of the engine may be connected to the crankshaft 203 included in the auxiliary machinery of the engine via the belt 32. A position of the top dead center 202 may be detected by the top dead center sensor of the mild hybrid vehicle and may be provided to the controller 200.

Referring to FIG. 2, the piston of the engine 205 has to be moved to the top dead center 202 of the engine when the engine is started by the starter-generator 30 after the engine 202 is stopped.

Referring to FIG. 3, the controller 200 may operate the start-generator 30 to rotate the belt 32 clockwise so that the piston of the engine 205 is moved to the top dead center 202 of the engine.

Referring to FIG. 4, the controller 200 may operate the starter-generator 30 to rotate the belt 32 counterclockwise so that the piston of the engine 205 is moved to the top dead center 202 of the engine.

According to a step 120, after the piston of the engine 205 is moved to the top dead center 202 of the engine, the controller 200 may control or operate the starter-generator 30 and the starter 34 via a controller area network (CAN) which is a vehicle network so that the starter-generator and the starter generate a maximum torque (or a high torque) to start the engine. In more detail, the starter-generator 30 may rotate the crankshaft 203 by driving the belt 32, and at the same time, the starter 34 may rotate the crankshaft. A drive shaft of the starter 34 may be connected to the crankshaft 203.

Describing the step 115 and the step 120 in detail, the controller 200 may operate the starter-generator 30 and the starter 34 that receives electric power from the second battery 42 that stores a voltage less than a voltage of the first battery 40 so that the engine 205 is started.

According to a step 125, when it is determined that the ambient air temperature of the engine 205 is equal to or less than the temperature reference value in the determination step 105 or when it is determined that the SOC of the first battery 40 is equal to or less than the reference value in the determination step 110, the controller 200 may operate or control a relay of the mild hybrid vehicle in order to apply a current (or a high current) greater than a current reference value to the starter 34 so that the starter starts the engine 205. The starter 34 may generate a high torque (e.g., 2 (KW)) when the engine 205 is started.

The components, "~unit", block, or module which are used in the embodiments described above may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~part', or the like may be embedded in a computer-readable storage medium, and some part thereof may be dispersedly distributed in a plurality of computers.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

As set forth above, certain embodiments of the present invention have been disclosed in the accompanying drawings and the specification. Herein, specific terms have been used, but are just used for the purpose of describing the present invention and are not used for qualifying the meaning or limiting the scope of the present invention, which is disclosed in the appended claims. Therefore, it will be understood by those skilled in the art that various modifications and equivalent exemplary embodiments are possible from the present invention. Accordingly, the actual technical protection scope of the present invention can be determined by the spirit of the appended claims.

DESCRIPTION OF SYMBOLS

30: MHSG
34: starter
40: first battery
42: second battery
200: controller
205: engine

What is claimed is:

1. A method of controlling a mild hybrid vehicle, comprising:
determining, by a controller, whether a state of charge of a first battery that supplies electric power to a starter-generator exceeds a reference value; and
operating, by the controller, the starter-generator and a starter that receives electric power from a second battery that stores a voltage less than a voltage of the first battery so that an engine of the mild hybrid vehicle is started when it is determined that the state of charge of the first battery exceeds the reference value and it is determined that an ambient air temperature of the engine exceeds a temperature reference value.

2. The method of claim 1, further comprising:

determining, by the controller, whether an ambient air temperature outside of the engine exceeds the temperature reference value, wherein the controller operates the starter to start the engine when it is determined that the ambient air temperature of the engine is equal to or less than the temperature reference value.

3. The method of claim 1, wherein the operating the starter-generator and the starter comprises:

operating, by the controller, the starter-generator in order to rotate a crankshaft of the engine so that a piston of the engine is moved to a top dead center of the engine; and operating, by the controller, the starter-generator and the starter to start the engine after the piston of the engine is moved to the top dead center of the engine.

4. The method of claim 3, wherein the starter-generator is connected to the crankshaft via a belt.

5. The method of claim 3, wherein a drive shaft of the starter is connected to the crankshaft.

6. The method of claim 1, wherein the controller operates a relay of the mild hybrid vehicle in order to apply a current greater than a current reference value to the starter so that the starter starts the engine when it is determined that the state of charge of the first battery is equal to or less than the reference value.

7. The method of claim 2, wherein the controller operates a relay of the mild hybrid vehicle in order to apply a current greater than a current reference value to the starter so that the starter starts the engine when it is determined that the ambient air temperature of the engine is equal to or less than the temperature reference value.

* * * * *